(12) United States Patent
Zhang et al.

(10) Patent No.: US 10,551,710 B2
(45) Date of Patent: Feb. 4, 2020

(54) TRANSPARENT DISPLAY DEVICE

(71) Applicants: BOE Technology Group Co., Ltd., Beijing (CN); Beijing BOE Display Technology Co., Ltd., Beijing (CN)

(72) Inventors: Yu Zhang, Beijing (CN); Hao Zhou, Beijing (CN); Weihao Hu, Beijing (CN); Hai Chi, Beijing (CN); Liang Zhang, Beijing (CN); Wei Zhang, Beijing (CN)

(73) Assignees: BOE TECHNOLOGY GROUP CO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 15/769,505

(22) PCT Filed: Sep. 28, 2017

(86) PCT No.: PCT/CN2017/104042
§ 371 (c)(1),
(2) Date: Apr. 19, 2018

(87) PCT Pub. No.: WO2018/166177
PCT Pub. Date: Sep. 20, 2018

(65) Prior Publication Data
US 2019/0101774 A1 Apr. 4, 2019

(30) Foreign Application Priority Data
Mar. 17, 2017 (CN) .......................... 2017 1 0160588

(51) Int. Cl.
G02F 1/139 (2006.01)
G02F 1/1335 (2006.01)
G02F 1/1347 (2006.01)

(52) U.S. Cl.
CPC .......... *G02F 1/139* (2013.01); *G02F 1/13471* (2013.01); *G02F 1/133504* (2013.01); *G02F 1/133526* (2013.01)

(58) Field of Classification Search
CPC .............. G02F 1/139; G02F 1/133606; G02F 1/133504; G02F 1/133526; G02F 2001/133607; G02F 1/13471
(Continued)

(56) References Cited

U.S. PATENT DOCUMENTS

| | | | |
|---|---|---|---|
| 8,770,813 B2* | 7/2014 | Bohn | G02F 1/133615 362/601 |
| 2009/0015756 A1* | 1/2009 | Lee | G02F 1/133615 349/67 |

(Continued)

FOREIGN PATENT DOCUMENTS

| | | |
|---|---|---|
| CN | 102262262 A | 11/2011 |
| CN | 102520549 A | 6/2012 |

(Continued)

OTHER PUBLICATIONS

Chinese Office dated Oct. 9, 2018 for CN201710160588.0.
English translation of ISR for PCT/CN2017/104042 dated Jan. 1, 2018.

Primary Examiner — Nathanael R Briggs
Assistant Examiner — William D Peterson
(74) Attorney, Agent, or Firm — Arent Fox LLP; Michael Fainberg

(57) ABSTRACT

There is disclosed a transparent display device including: a transparent display panel, a first optical structure fixed on a light incidence side of the transparent display panel, and a plurality of light sources arranged on a side of the first optical structure, wherein there is a scattering lens structure arranged on a side of the first optical structure facing away from the transparent display panel and a refractive index of (Continued)

a medium between the first optical structure and the transparent display panel is less than a refractive index of the first optical structure.

13 Claims, 5 Drawing Sheets

(58) Field of Classification Search
USPC .......................................................... 349/112
See application file for complete search history.

(56) References Cited

U.S. PATENT DOCUMENTS

2014/0369072 A1 12/2014 Liao et al.
2015/0002783 A1 1/2015 Park
2016/0349435 A1* 12/2016 Hsiao .................... G02F 1/1335

FOREIGN PATENT DOCUMENTS

| | | |
|---|---|---|
| CN | 103489373 A | 1/2014 |
| CN | 103680316 A | 3/2014 |
| CN | 104100930 A | 10/2014 |
| CN | 104252063 A | 12/2014 |
| CN | 104279508 A | 1/2015 |
| CN | 104375325 A | 2/2015 |
| CN | 102654273 A | 9/2015 |
| CN | 204986867 A | 1/2016 |
| CN | 106646727 A | 5/2017 |
| JP | 2003255318 A | 9/2003 |

* cited by examiner

TRANSPARENT DISPLAY DEVICE

This application is a National Stage of International Application No. PCT/CN2017/104042, filed Sep. 28, 2017, which claims priority to Chinese Patent Application No. 201710160588.0, filed Mar. 17, 2017, both of which are hereby incorporated by reference in their entireties.

FIELD

This disclosure relates to the field of display technologies, and particularly to a transparent display device.

BACKGROUND

As the display technologies are advancing constantly, various new technologies are emerging, and the transparent display technology has been increasingly recognized due to its transparent display panel and its unique application.

The transparent display generally refers to a display where the display can display in a transparent state so that a viewer can see an image displayed on the display, and an image after the display. There are a number of possible applications of the transparent display, e.g., a window of a building or a vehicle, an exhibition window of a shopping mall, etc. In addition the application thereof to these large devices, a small device, e.g., a handheld tablet computer, etc., can also benefit from the transparent display, and for example, a user viewing a map can view a front scene through a screen.

In the field of a Liquid Crystal Display (LCD), in order to provide a light source for an object to be exhibited, a transparent display device is frequently designed as a box structure arranged at a light incidence side of a transparent display screen, and a general light source is fixed on a side of the box, where the general light source can be a common Light Emitting Diode (LED) structure on a side of an illuminative display or a backlight source; and the object to be exhibited is placed into the box, and illuminated by light rays of the general light source fixed on the side of the box. This structure is an inherent box structure with a cumbersome appearance as a whole, poor flexibility in exhibition, and a lack of human-machine interaction.

SUMMARY

Embodiments of the disclosure provide a transparent display device including: a transparent display panel, a first optical structure fixed on a light incidence side of the transparent display panel, and a plurality of light sources arranged on a side of the first optical structure, wherein there is a scattering lens structure arranged on a side of the first optical structure facing away from the transparent display panel, and a refractive index of a medium between the first optical structure and the transparent display panel is less than a refractive index of the first optical structure.

Optionally in the transparent display device according to the embodiments of the disclosure, the scattering lens structure includes a plurality of convex structures arranged uniformly on the side of the first optical structure facing away from the transparent display panel.

Optionally in the transparent display device according to the embodiments of the disclosure, the convex structures are lenticular lens.

Optionally in the transparent display device according to the embodiments of the disclosure, there is a toothed structure arranged inside each of the lenticular lens to converge light rays reflected to each of the convex structures from the first optical structure.

Optionally in the transparent display device according to the embodiments of the disclosure, there is an arc-shaped cavity arranged in each of the convex structures.

Optionally in the transparent display device according to the embodiments of the disclosure, there are diffusion particles or bubbles uniformly distributed inside the first optical structure.

Optionally in the transparent display device according to the embodiments of the disclosure, both the first optical structure and the convex structures are made of transparent materials.

Optionally in the transparent display device according to the embodiments of the disclosure, the first optical structure and the convex structures are made of a same material.

Optionally in the transparent display device according to the embodiments of the disclosure, the first optical structure and the convex structures are structured integrally; or the first optical structure fit onto the convex structures via transparent optical adhesive.

Optionally in the transparent display device according to the embodiments of the disclosure, a thickness of the first optical structure lies between 1.5 mm and 4.5 mm.

Optionally in the transparent display device according to the embodiments of the disclosure, there is a second optical structure arranged between each of the light sources and the first optical structure to converge light rays exiting from each of the light sources.

Optionally in the transparent display device according to the embodiments of the disclosure, the second optical structure is a circular truncated cone; and a diameter of a surface of the second optical structure on a side thereof proximate to the first optical structure is greater than a diameter of a surface of the second optical structure on a side thereof proximate to the light sources, and a side surface of the second optical structure is coated with a reflection layer.

Optionally in the transparent display device according to the embodiments of the disclosure, the diameter of the surface of the second optical structure on the side thereof proximate to the first optical structure is not greater than a thickness of the first optical structure.

Optionally in the transparent display device according to the embodiments of the disclosure, the diameter of the surface of the second optical structure on the side thereof proximate to the first optical structure lies between 1.5 mm and 4.5 mm, and a thickness of the second optical structure lies between 0.56 mm and 1.68 mm.

Optionally in the transparent display device according to the embodiments of the disclosure, there is a groove arranged on a side of the second optical structure proximate to the light sources, and a total reflection lens is arranged in the groove; and the total reflection lens is a revolving box, and a section of the total reflection lens in a direction perpendicular to surfaces of the second optical structure is shaped as two symmetric triangles.

DETAILED DESCRIPTION OF THE EMBODIMENTS

Figure 1:
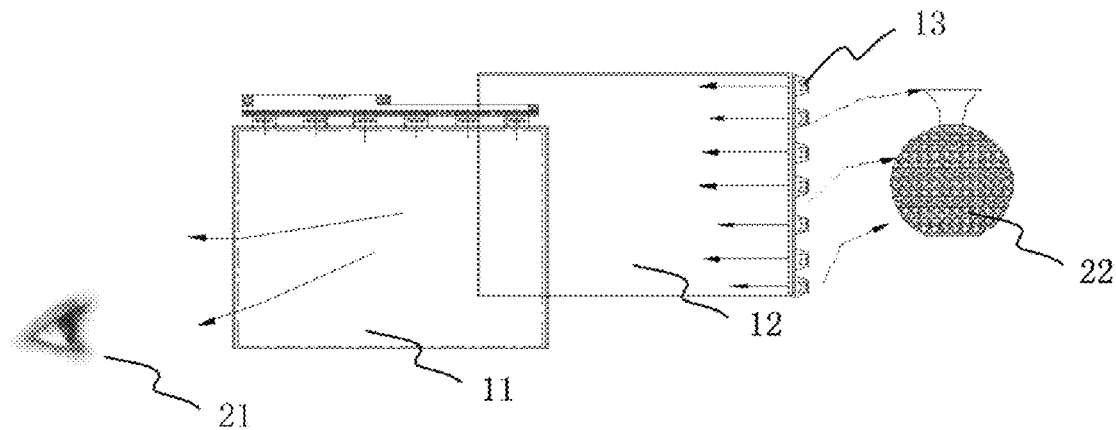
FIG. 1 is a first structural diagram of a transparent display device according to embodiments of the disclosure.

At least one embodiment of the disclosure discloses a transparent display device so as to address at least the problem in the related art of poor flexibility of the transparent display device which is designed as a box structure.

Particular implementations of the transparent display device according to the embodiments of the disclosure will be described below in details with reference to the drawings. The shapes and sizes of respective components in the drawings are not intended to reflect any real proportion, but only intended to suggest the disclosure.

Embodiments of the disclosure provide a transparent display device as illustrated in FIG. 1, which includes: a transparent display panel 11, a first optical structure 12 fixed on a light incidence side of the transparent display panel 11, and a plurality of light sources 13 arranged on a side of the first optical structure 12, where there is a scattering lens structure (not illustrated in FIG. 1) arranged on a side of the first optical structure 12 facing away from the transparent display panel 11, and a refractive index of a medium between the first optical structure 12 and the transparent display panel 11 is less than a refractive index of the first optical structure 12.

In the transparent display device according to the embodiments of the disclosure, since there is the scattering lens structure arranged on the side of the first optical structure 12 facing away from the transparent display panel 11, and the refractive index of the medium between the first optical structure 12 and the transparent display panel 11 is less than the refractive index of the first optical structure 12, so among light rays of the light sources 13 incident on a surface of the first optical structure 12 on a side thereof proximate to the transparent display panel 11, light rays at an incidence angle smaller than a critical angle of total reflection are transmitted to a transparent display structure through the first optical structure 12 to provide the transparent display structure with a backlight source, and light rays at an incidence angle larger than or equal to the critical angle of total reflection are reflected to the scattering lens structure, and transmitted to an object 22 to be exhibited, arranged on a side facing away from the transparent display device to provide the object 22 to be exhibited, with the light sources 13, thus achieving a transparent display effect while both of the sides are open, which can greatly improve the flexibility of the transparent display device over the transparent display device which is designed as a box structure.

FIG. 1 is a stereogram of the transparent display device above in an exploded view, where the light sources 13 are arranged on only one side of the first optical structure 12, for example, although the light sources 13 can alternatively be arranged on another side of the first optical structure 12 as needed in practical, or the light sources 13 can be arranged on all the four sides of the first optical structure 12 in a scenario where high brightness is required. Here the number of light sources 13 will not be limited to any particular number. The light sources 13 can be Light-Emitting Diode (LED) chips, e.g., package (PKG) structures of Model 1313, or 1515, etc. After the light rays exiting from the light sources 13 are optically guided by the first optical structure 12, a part thereof are transmitted to the transparent display panel 11 to provide the transparent display panel 11 with the backlight source, and the other part thereof are transmitted to the object 22 to be exhibited, to provide the object 22 to be exhibited, with the light sources 13, so the human eyes at a side of the transparent display panel 11 facing away from the first optical structure 12 not only can see an image displayed on the transparent display panel 11, but also can see the object 22 to be exhibited, through the transparent display panel 11.

Optionally in the transparent display device according to the embodiments of the disclosure, the first optical structure can be a light guiding plate or a light diffusion plate, although the embodiments of the disclosure will not be limited thereto.

Figure 3:
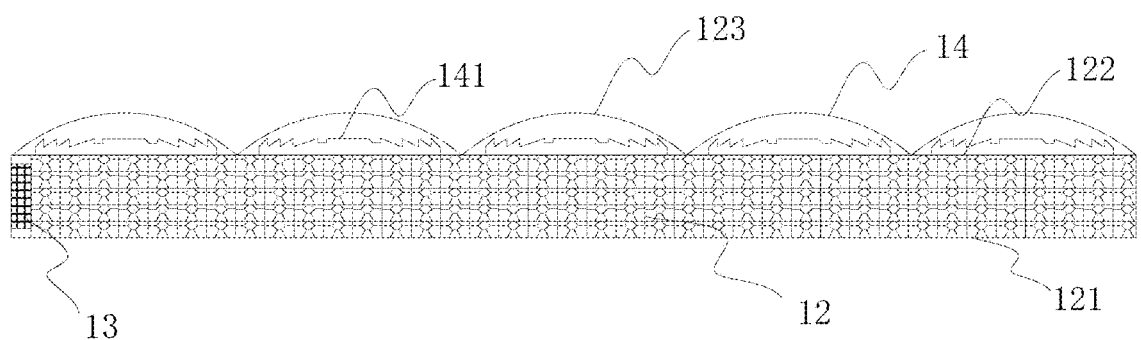
FIG. 3 is a schematic internal structural diagram of the first optical structure and the convex structures according to the embodiments of the disclosure.

Optionally in the transparent display device according to the embodiments of the disclosure, as illustrated in FIG. 3, the scattering lens structure includes a plurality of convex structures 14 arranged uniformly on the side of the first optical structure 12 facing away from the transparent display panel 11 to reflect the light rays at an incidence angle larger than or equal to the critical angle of total reflection to the convex structures 14 to be transmitted to the object 22 to be exhibited, arranged on the side facing away from the transparent display device.

A light transmission principle of the first optical structure 12 will be described below with reference to FIG. 2A, FIG. 2B, and FIG. 2C.

Figure 2A:
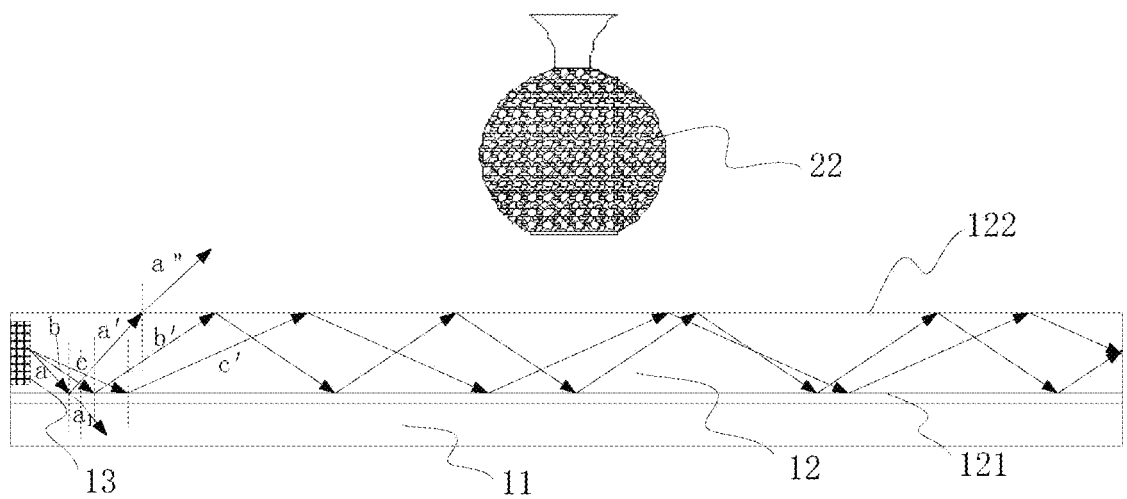
FIG. 2A is a schematic diagram of a light path of light rays in a first optical structure.
Figure 2B:
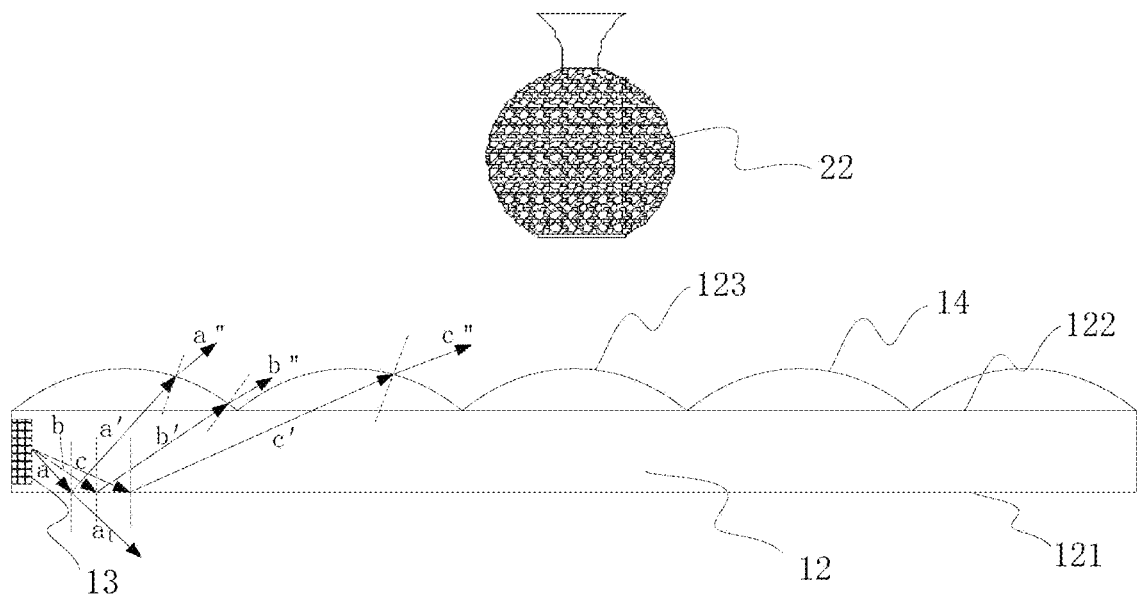
FIG. 2B is a first schematic diagram of a light path of light rays in the first optical structure and convex structures.
Figure 2C:
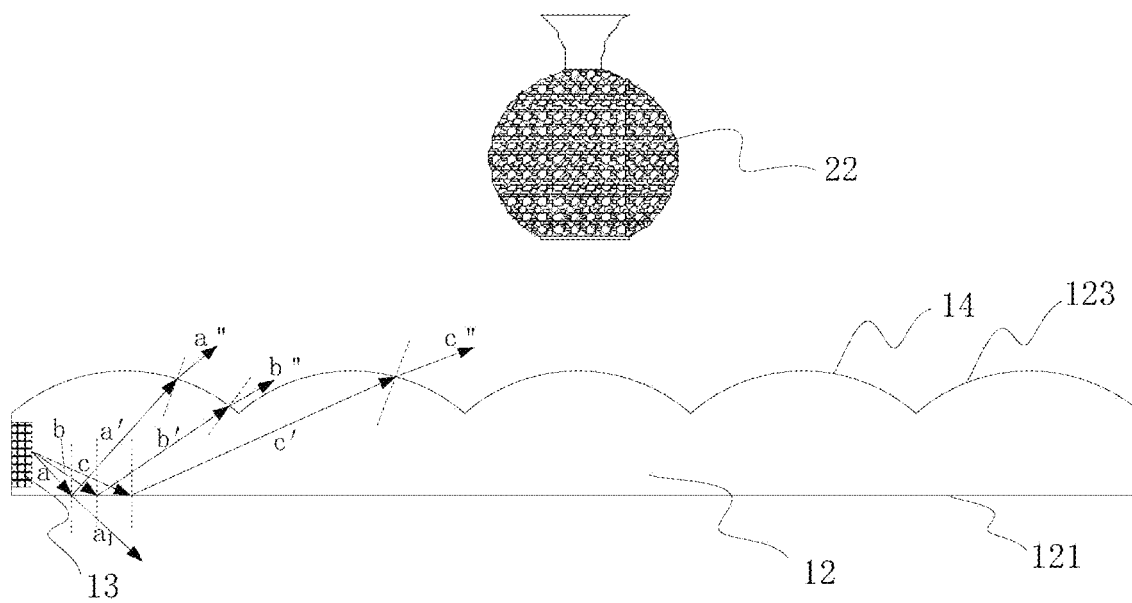
FIG. 2C is a second schematic diagram of a light path of light rays in the first optical structure and the convex structures.

It shall be noted that FIG. 2B and FIG. 2C are schematic structural diagrams of the first optical structure 12 and the convex structures 14 according to the embodiments of the disclosure, and FIG. 2A is a schematic structural diagram for comparison, where the convex structures 14 are not arranged, where FIG. 2A is only intended to illustrate an effect for comparison, but not intended to represent the structure of the transparent display device according to the embodiments of this discourse.

Referring to FIG. 2A, the transparent display panel 11 can be fixed with the first optical structure 12 using an external structural piece, or can be fit onto the first optical structure 12 using an optical adhesive, and if the transparent display panel is fixed with the first optical structure using an external structural piece, then there may be an air layer between the transparent display panel 11 and the first optical structure 12; and if the transparent display panel is fit onto the first optical structure using an optical adhesive, then there may be an optical adhesive layer between the transparent display panel 11 and the first optical structure 12. FIG. 2A illustrates the transparent display panel 11 and the first optical structure 12, between which there is the air layer or the optical adhesive layer, where the refractive index of the optical adhesive layer is less than the refractive index of the first optical structure 12. Therefore the light rays exiting from the light sources 13 and arriving at the first optical structure 12 complies with the law of total reflection, that is, if light is incident from an optically dense medium (in which there is a higher refractive index of the light) onto an interface of an optically thinner medium (in which there is a lower refractive index of the light), then all of the light will be reflected back into the original medium, where the total reflection surface is the surface of the first optical structure 12 on the side thereof proximate to the transparent display panel 11.

Taking the air layer as an example, the light rays arrive at the surface of the first optical structure 12 at an incidence angle of a, and if the light is totally reflected, then $n*\sin a=1$ will be satisfied; and if the material of the first optical structure 12 is organic glass (PolymethylMethacrylate, PMMA)) with a refractive index of 1.49, then there will be $a=\arcsin(1/1.49)=42°$, that is, the light is totally reflected on the surface of the first optical structure 12 at the critical angle of 42°, so the light rays with an incidence angle larger than 42° are reflected back into the first optical structure 12. The same principle as the air layer will apply to the optical adhesive layer with a refractive index less than the refractive index of the first optical structure 12, so a repeated description thereof will be omitted here.

Referring to FIG. 2A again, when the convex structures 14 are not arranged on the side of the first optical structure 12 facing away from the transparent display panel 11, the refractive index of the first optical structure 12 is greater than the refractive index of the air layer or the optical adhesive layer, so the condition of total reflection is satisfied on both the surfaces of the first optical structure 12 on the two sides thereof; and when the light rays exits from the first optical structure 12, the light rays is incident from the optically dense medium onto the optically thinner medium, and when the incidence angle is larger than the critical angle, the light rays are totally reflected. At this time, the light rays are reflected inside the first optical structure 12 all the time instead of exiting.

In FIG. 2A, there are illustrated three light rays exiting from a light source 13 at the same position by way of an example, where the light ray b is incident on a first surface 121 (the surface of the first optical structure 12 on the side thereof proximate to the transparent display panel 11) at an incidence angle equal to the critical angle of total reflection, so when the light ray b is incidence on the first surface 121, it is totally reflected; and when reflected light b' of the light ray b is incidence on a second surface 122 (the surface of the first optical structure 12 on the side facing away from the transparent display panel 11), it is also totally reflected, so the light ray b is reflected in the first reflective structure all the time instead of exiting from the first optical structure 12. A light ray c in FIG. 2A is incidence on the first surface 121 at an incidence angle larger than the critical angle of total reflection, so it is also totally reflected, and reflected light of the light ray c, i.e., a light ray c', is also reflected in the first optical structure 12 all the time. Only a light ray incidence on the first surface 121 at an incidence angle smaller than the critical angle of total reflection can exit, and for example, when a light ray a in FIG. 2A is incidence on the first surface 121, the majority of the light ray is reflected, and transmitted to the transparent display panel 11 through the first surface 121, i.e., a light ray $a_1$, and the minority of the light ray is reflected, and transmitted to the second surface 122, i.e., a light ray a'; and since the light ray a' is incidence on the second surface 122 at an incidence angle smaller than the critical angle of total reflection, the light ray a' can be refracted at the second surface 122, and exit, i.e., a light ray a".

As can be apparent from the analysis above, when the convex structures 14 are not arranged on the side of the first optical structure 12 facing away from the transparent display panel 11, only a part of the light rays at a smaller incidence angle on the first surface 121 can exit from the first optical structure 12, but since the first optical structure 12 is made of a transparent material, a fraction of the light rays are reflected on the first surface 121, and as can be apparent from FIG. 2a, in this case, only a fraction of the light rays proximate to the light source 13 can exit from the second surface 122, and there are almost no light rays exiting further from the light source 13, so the transparent display panel 11 cannot be provided normally with any backlight source.

Referring to FIG. 2B, when the convex structures 14 are arranged on the side of the first optical structure 12 facing away from the transparent display panel 11, since third surfaces 123 (the surfaces of the convex structures 14 on the sides thereof facing away from the first optical structure 12) are curved, so the light rays totally reflected on the first surface 121 may be incident on the third surfaces 123 at an incidence angle failing to reach the critical angle of total reflection, so that the majority of the light rays can exit from the third surfaces 123.

In order to compare the effects of the existing light rays with each other, FIG. 2B also illustrate the light ray a, the light ray b, and the light ray c by way of an example, where the light ray b is incident on the first surface 121 at an incidence angle equal to the critical angle of total reflection, and when totally reflected light b' of the light ray b is incident on the third surface 123, the light ray b' is incidence on the third surface 123 at an incidence angle smaller than the incidence angle of the light ray b' on the second surface 122, so the light ray b' can exit from the convex structure 14 instead of being totally reflected on the third surface 123, i.e., a light ray b". Like the light ray b, the light ray c is totally reflected on the first surface 121, thus resulting in a light ray c', which is incidence on the third surface 123, and since the condition of total reflect is not satisfied, the light ray c' can exit from the third surface 123, i.e., a light ray c". Since the light ray a is incidence on the first surface 121 at an incidence angle smaller than the critical angle of total reflection, it can exit from the first surface 121, i.e., a light ray $a_1$, and also can exit from the third surface 123, i.e., a light ray a".

As can be apparent from the analysis above, when the convex structures 14 are arranged on the side of the first optical structure 12 facing away from the transparent display panel 11, the light rays at a smaller incidence angle on the first surface 121 can exit from the first surface 121, and also can exit from the third surface 123, the light rays at an incidence angle larger than the critical angle of total reflection on the first surface 121 can only exit from the third surface 123, and only a fraction of the light rays at an incidence angle also larger than the critical angle of total reflection on the third surface 123 cannot exit from the first optical structure 12 or the convex structures 14. In this way, the transparent display panel 11 can be provided with the backlight source, and also the object 22 to be exhibited can be provided with the sufficient light sources.

It shall be noted that both the first optical structure 12 and the convex structures 14 are made of transparent materials, which can preferably be PMMA, and can also be Polycarbonate (PC), Polystyrene (PS), or a methyl methacrylate-styrene copolymer (MS), etc., where the materials of the first optical structure 12 and the convex structures 14 will not be limited thereto, so the first optical structure 12 and the convex structures 14 have the same or approximate refractive indexes, so that the light rays are slightly refracted on the second surface 122, which is not illustrated in FIG. 2b. In summary, since both the first optical structure 12 and the convex structures 14 are made of the transparent materials, there is a high light transmittance on one hand, and there is approximate optical performance (e.g., refractive indexes) of the first optical structure 12 and the convex structures 14 so that the light rays are slightly refracted on the second surface 122 on the other hand. Furthermore in a real application, when the first optical structure 12 and the convex structures 14 are made of the same material, the first optical structure 12 and the convex structures 14 can also be formed integrally, so that no light rays are refracted on the second surface 122, and the fabrication process is also simplified, as illustrated in FIG. 2C.

Optionally in the transparent display device above according to the embodiments of the disclosure, the convex structures 14 can be arranged as lenticular lens.

A lenticular lens is a lens with a surface thereof shaped as a cylindrical longitudinal section, and a plurality of lenticular lens can be arranged together into an array of lens to focus light rays to thereby improve the intensity of central light.

Optionally in the transparent display device above according to the embodiments of the disclosure, in order to improve the converging function of the lenticular lens, there is a toothed structure 141 arranged inside each of the lenticular lens to converge light rays reflected to each of the convex structures 14 from the first optical structure 12 as illustrated in FIG. 3.

As can be apparent from FIG. 3, the toothed structure 141 can be arranged with endocentric edge saw-teeth, so that the light rays reflected from the first surface 121 are refracted in an endocentric manner to thereby be converged, and the saw-teeth at different positions can be arranged at different heights to thereby improve the converging function so as to reduce the exit angle of the light rays exiting from each of the convex structures 14, thus improving the intensity of central light for the exiting light rays.

Optionally the toothed structure 141 can be fabricated separately from a component above the toothed structure 141, and then fit together therewith using optical adhesive or another material, and the toothed structure 141 and the component may or may not be made of the same material, although the embodiments of the disclosure will not be limited thereto.

In a practical application, the convex structures 14 can alternatively be arranged as other lens with a convex light exit face, e.g., Fresnel lens, convex lens, etc., although the type of the convex structures 14 will not be limited thereto.

Figure 4A:
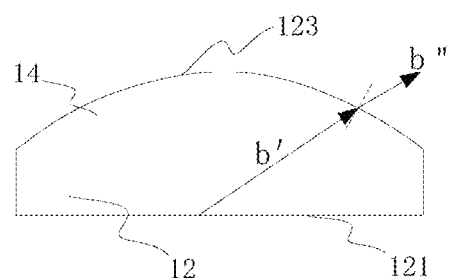
FIG. 4A is a first schematic diagram of a light path of light rays in a convex structure.
Figure 4B:
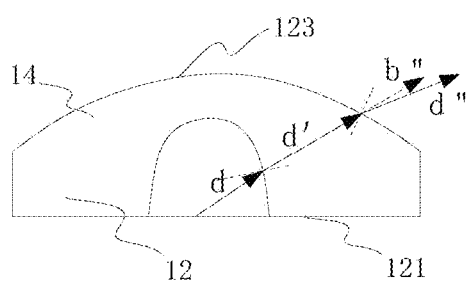
FIG. 4B is a second schematic diagram of a light path of light rays in a convex structure.

Optionally in the transparent display device above according to the embodiments of the disclosure, in order to improve the uniformity of the light rays exiting from the convex structures 14, the convex structures 14 can be arranged with the structure as illustrated in FIG. 4B, that is, an arc-shaped cavity is arranged inside each of the convex structures 14.

FIG. 4A illustrates a light path in a convex structure 14 arranged without any cavity, and for the sake of a convenient illustration, FIG. 4A and FIG. 4B illustrate only one convex structure 14 in a sectional view. The light ray b' in FIG. 4A, and a light ray d in FIG. 4B exit from a light source 13 at the same position, and the same exit angle, and the light ray b" is a light ray after the light ray b' incident on the third surface 123 is refracted; and in FIG. 4B, the cavity is arranged in the convex structure 14 so that the light rays exiting from the light source 13 travel through a segment of the air layer, and are refracted for the second time at the interface between the cavity and the convex structure 14. In order to compare more clearly the exit angles of the light ray b" and the light ray d" on the third surface 123 in FIG. 4B, the light ray b" in FIG. 4A is illustrated in FIG. 4B (the dotted arrow in FIG. 4B) for comparison, and as can be apparent from FIG. 4B, the light rays are refracted twice in the convex structure 14 arranged with the cavity, so the exit angle is apparently larger than that in the convex structure 14 arranged without any cavity, thus improving the uniformity of the light rays exiting from the surface of the convex structure 14.

Referring to FIG. 3, in the transparent display device above according to the embodiments of the disclosure, there are diffusion particles or bubbles uniformly distributed inside the first optical structure 12.

As illustrated in FIG. 3, the material filled in the first optical structure 12 represents uniformly distributed diffusion particles or bubbles, which are arranged to facilitate conduction of the light rays in the first optical structure 12 to thereby destroy the condition of total reflection on the surfaces of the first optical structure 12 so as to improve the amount of exiting light, and to extend the optical paths of the light rays, thus improving the brightness of central light.

Optionally in the transparent display device above according to the embodiments of the disclosure, the first optical structure 12 and the convex structure 14 are made of the same material.

Since both the first optical structure 12 and the convex structures 14 are made of the transparent materials, they can be made of the same material, e.g., PMMA, PC, PS, MS, or the like, or can be made of another material, only by way of an example, although the material of the first optical structure 12 and the convex structures 14 will not be limited thereto.

The first optical structure 12 and the convex structures 14 can be fabricated in a number of implementations, e.g.: in a first implementation, the first optical structure 12 and the convex structures 14 are structured integrally; or in a second implementation, the first optical structure 12 is fit onto the convex structures 14 using transparent optical adhesive.

When the first optical structure 12 and the convex structures 14 are made of the same material, they can be fabricated in the first or second implementation; and when the first optical structure 12 and the convex structures 14 are made of different materials, they can only be fabricated in the second implementation. Furthermore the thickness of the first optical structure 12 can be controlled between 1.5 mm and 4.5 mm, e.g., 1.5 mm, 3 mm, or 4.5 mm, where the thickness of the first optical structure 12 is arranged between 1.5 mm and 4.5 mm so that there will be a space sufficient to arrange the light sources 13 on the side of the first optical structure 12, and the size here is only preferable, but the size of the first optical structure 12 will not be limited thereto.

Figure 5A:
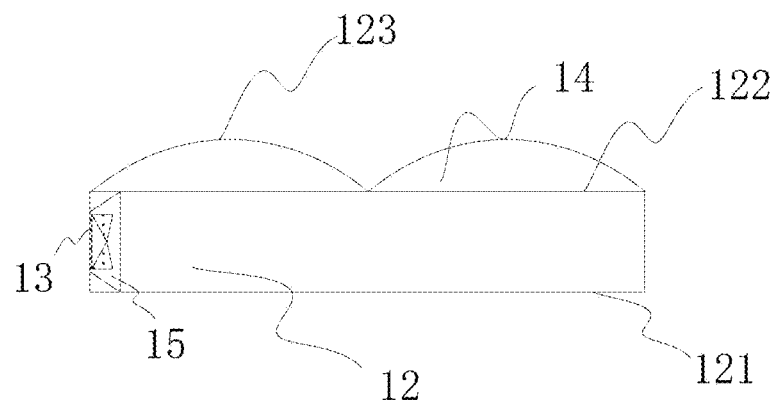
FIG. 5A is a first schematic diagram of a position where a second optical structure is arranged according to the embodiments of the disclosure.
Figure 5B:
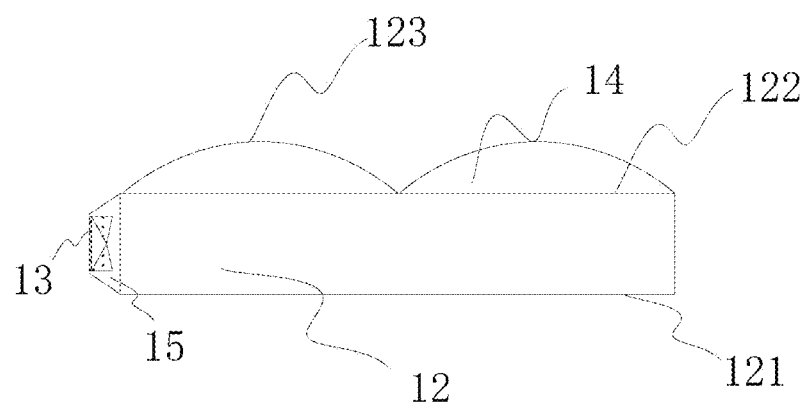
FIG. 5B is a second schematic diagram of a position where a second optical structure is arranged according to the embodiments of the disclosure.

Optionally in the transparent display device above according to the embodiments of the disclosure, there is a second optical structure 15 arranged between each of the light sources 13 and the first optical structure 12 to converge the light rays exiting from each of the light sources 13, as illustrated in FIG. 5A and FIG. 5B.

Optionally the second optical structure 15 can be fit onto a side of the first optical structure 12, at least in the following two implementations.

In a first implementation, a groove corresponding to the second optical structure 15 is arranged on the side of the first optical structure 12, and the second optical structure 15 is fit into the groove of the first optical structure 12 using optical adhesive, as illustrated in FIG. 5A.

In a second implementation, the second optical structure 15 can be fit directly onto the side of the first optical structure 12 without arranging any groove, as illustrated in FIG. 5B.

Some space can be saved in the first implementation, but the groove shall be fabricated in an additional process; and although some space is occupied by the second optical structure 15 in the second implementation, the process of fabricating the groove can be dispensed with. Furthermore optionally if the first optical structure 12 and the second optical structure 15 are made of the same material, then the second optical structure 15 may be formed integrally while the first optical structure 12 is being fabricated.

It shall be noted that FIG. 5A and FIG. 5B illustrate only two convex structures in order to illustrate the position of the second optical structure 15 more clearly, but the number of convex structures will not be limited thereto. The first and second implementations are preferred implementations in which the second optical structure 15 is arranged, but it can be arranged otherwise in a practical application, and the embodiments of the disclosure will not be limited thereto.

Figure 5C:
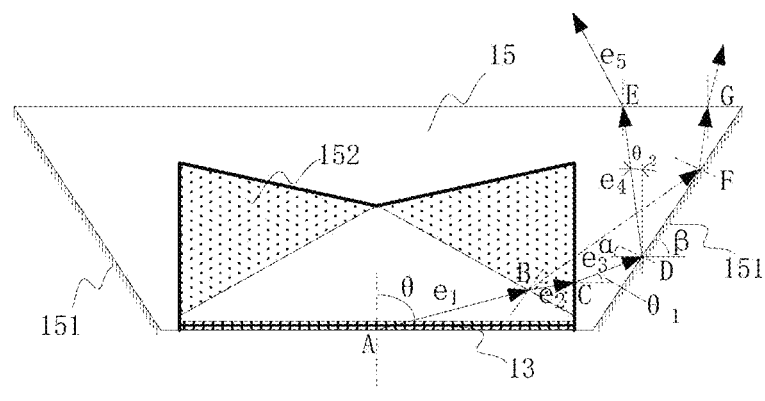
FIG. 5C is a schematic diagram of a second optical structure according to the embodiments of the disclosure in a sectional view.

Optionally in the transparent display device above according to the embodiments of the disclosure, each second optical structure 15 is a circular truncated cone as illustrated in FIG. 5C; and a diameter of a surface of the second optical structure 15 on a side thereof proximate to the first optical structure 12 is greater than a diameter of a surface of the second optical structure on a side thereof proximate to the light sources 13, and a side surface of the second optical structure 15 is coated with a reflection layer 151.

FIG. 5C illustrates a sectional view of the second optical structure 15, and since the diameter of the surface of the second optical structure 15 on the side thereof proximate to the first optical structure 12 is greater than the diameter of the surface thereof on the side thereof proximate to the light sources 13, there is some inclination angle between a side surface of the second optical structure 15, and the top and the bottom thereof; and the side surface of the second optical structure 15 is coated with the reflection layer 151, so that the light rays incident on the side surface of the second optical structure 15 can be refracted in an endocentric manner, so the light rays exiting from the light sources at a larger exit angle can be refracted in an endocentric manner to thereby alleviate a loss of the light sources 13 so as to improve the intensity of central light for the light rays exiting from the light sources 13.

Optionally in the transparent display device above according to the embodiments of the disclosure, the diameter of the surface of the second optical structure 15 on the side thereof proximate to the first optical structure 12 is not greater than the thickness of the first optical structure 12.

With this arrangement, there is a space sufficient to arrange a second optical structure 15 on the side of the first optical structure 12 on one hand, and all of the light rays exiting from the light sources 13 can be incident into the first optical structure 12 through the second optical structure 15 to thereby avoid the light from being leaked on the other hand.

Furthermore the diameter of the surface of the second optical structure 15 on the side thereof proximate to the first optical structure 12 lies between 1.5 mm and 4.5 mm, e.g., 1.5 mm, 3 mm, or 4.5 mm, and the thickness of the second optical structure 15 lies between 0.56 mm and 1.68 mm, e.g., 0.56 mm, 1.12 mm, or 1.68 mm. For example, the diameter of the surface of the second optical structure 15 on the side thereof proximate to the first optical structure 12 is set to 3 mm, and since the thickness of the first optical structure 12 is 3 mm, the second optical structure 15 can match in size with the first optical structure 12, so they can be easily fit together. The thickness of the second optical structure 15 is set to 1.12 mm, which is less than the diameter of the surface thereof on the side proximate to the first optical structure 12, so that there is a larger inclination angle between the side surface of the second optical structure 15, and the top and the bottom thereof as long as the diameter of the surface thereof on the side facing away from the first optical structure 12 is set slightly less than 3 mm, so some inclination angle can be easily formed between the side surface of the second optical structure 15, and the top and the bottom thereof; and also the thickness of the second optical structure 15 can be made smaller, so the second optical structure 15 can be fit directly on the side of the first optical structure 12 without affecting the appearance of the first optical structure 12. The size here is only preferable, but the size of the second optical structure will not be limited thereto.

Optionally in the transparent display device above according to the embodiments of the disclosure, there is a groove arranged on a side of each second optical structure 15 proximate to the light sources 13, and a total reflection lens 152 is arranged in the groove; and the total reflection lens 152 is a revolving box, and a section of the total reflection lens 152 in a direction perpendicular to surfaces of each second optical structure 15 is shaped as two symmetric triangles.

Referring to FIG. 5C, in order to further improve the converging function of the second optical structure 15, there is a total reflection lens 152 arranged in each second optical structure 15, and since the light rays exit from the light sources 13 in respective directions, in order to enable the light rays to exit uniformly from the light sources 13, the total reflection lens 152 can be arranged as a revolving box, that is, there are the same shapes of respective sections of the revolving box 152 in the direction perpendicular to the surfaces of each second optical structure 15, and particularly a triangle. FIG. 5c illustrates only an embodiment of the disclosure, but each second optical structure 15 can alternatively be structured otherwise to converge light beams in a practical application, and the embodiments of the disclosure will not be limited thereto.

Since both the second optical structure 15 and the total reflection lens 152 are made of transparent materials, which is generally PMMA, PC, PS, MS, or the like, and the refractive indexes of all these materials are approximate, in order to enable the light rays to be refracted between the second optical structure 15 and the total reflection lens 152, an air layer is arranged between the second optical structure 15 and the total reflection lens 152 (at a position denoted by the thick solid lines on the total reflection lens 152 illustrated in FIG. 5C) in a fabrication process, or both of them are fit onto each other via optical adhesive.

Referring to FIG. 5C, if a light ray $e_1$ exits from a light source 13 at the point A at the exit angle $\theta$, then the light ray passing the total reflection lens 152 will be refracted twice, that is, the light ray is refracted at the point B, thus resulting in a light ray $e_2$, and refracted at the point C, thus resulting in a light ray $e_3$. A light ray at a smaller exit angle $\theta$ exits directly from the surface of the second optical structure 15 on the side thereof proximate to the first optical structure 12 through the total reflection lens 152 (not illustrated); and a light at a larger exit angle θ is transmitted to the side of the second optical structure 15 through the total reflection lens 152, and reflected on the side of the second optical structure 15 at the point D in FIG. 5C, thus resulting in a light ray $e_4$, and the light ray $e_4$ is refracted at the point E on the surface of the second optical structure 15 on the side proximate to the first optical structure 12, and then exits, i.e., a light ray $e_5$.

In order to illustrate the converging function of the total reflection lens 152, the dotted lines in FIG. 5C represent a light path when the total reflection lens 152 is not arranged, and the solid lines represent a light path when the total reflection lens 152 is arranged, after the light rays are incident at the point B; and as can be apparent, if the total reflection lens 152 is not arranged, then the light ray $e_1$ will be incident directly at the point F after being refracted at the point B, and if the total reflection lens 152 is arranged, then the light ray $e_1$ refracted at the point B will be refracted once again, and incident on the surface of the second optical structure 15 at the point D ahead of F, so the reflection angle at the point D is smaller than the reflection angle at the point F, so that when these two light beams exit from the surface of the second optical structure 15, as can be apparent, the solid line is closer to the center of the light source 13, and the dotted line is closer to the edge of the light source 13, that is, the total reflection lens 152 can be arranged to improve the intensity of central light for the light rays exiting from the light source 13.

If the refractive index of the second optical structure 15 and the total reflection lens 152 is n, then the following equations can be derived under the Fresnel principle.

$$\sin\theta = n^*\sin\theta 1;\ \text{and}\ n^*\sin(\theta 1+\beta)=\sin(\alpha+\beta).$$

As can be apparent, $\tan\beta=(-n^*\sin\theta 1+\sin\alpha)/(n^*\cos\theta 1-\cos\alpha)=dy/dx$, $\beta=\frac{1}{2}(\pi/2+\theta 1+\alpha)$, and $\alpha=\tan-1[(180°-\theta)/60°-\tan 60°]$, so it can be concluded that the light rays at an incidence angle θ in the range of 0° to 60° can travel in an intended journey, that is, they deviate from the center of the light rays at a smaller angle, and the scattered light rays at an incidence angle θ in the range of 60° to 90° are redistributed by the total reflection lens 152, so that the diffusion angle of the light rays redistributed on the total reflection face at the point D can be controlled within ±30°.

In the transparent display device according to the embodiments of the disclosure, there is the scattering lens structure arranged on the side of the first optical structure facing away from the transparent display panel, and the refractive index of the medium between the first optical structure and the transparent display panel is less than the refractive index of the first optical structure, so among light rays of the light sources incident on the surface of the first optical structure on the side thereof proximate to the transparent display panel, light rays at an incidence angle smaller than a critical angle of total reflection are transmitted to the transparent display structure through the first optical structure to provide the transparent display structure with a backlight source, and light rays at an incidence angle larger than or equal to the critical angle of total reflection are reflected to the scattering lens structure, and transmitted to the object to be exhibited, arranged on the side facing away from the transparent display device to provide the object to be exhibited, with the light sources, thus achieving a transparent display effect while both of the sides are open, which can greatly improve the flexibility of the transparent display device over the transparent display device which is designed as a box.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

The invention claimed is:

1. A transparent display device, comprising: a transparent display panel, a first optical structure fixed on a light incidence side of the transparent display panel, and a plurality of light sources arranged on an end side of the first optical structure, wherein:
    a scattering lens structure is arranged on a side of the first optical structure facing away from the transparent display panel, and a refractive index of a medium between the first optical structure and the transparent display panel is less than a refractive index of the first optical structure;
    a second optical structure is arranged between each of the light sources and the end of the first optical structure to converge the light rays exiting from each of the light sources;
    a groove is arranged on a side of the second optical structure proximate to the light sources, and a total reflection lens is arranged in the groove; and
    the total reflection lens is a revolving body, and a section of the total reflection lens in a direction perpendicular to surfaces of the second optical structure is shaped as two symmetric triangles.

2. The transparent display device according to claim 1, wherein the scattering lens structure comprises a plurality of convex structures arranged uniformly on the side of the first optical structure facing away from the transparent display panel.

3. The transparent display device according to claim 2, wherein the convex structures are lenticular lens.

4. The transparent display device according to claim 3, wherein a toothed structure is arranged inside each of the lenticular lens to converge light rays reflected to each of the convex structures from the first optical structure.

5. The transparent display device according to claim 2, wherein an arc-shaped cavity arranged in each of the convex structures.

6. The transparent display device according to claim 1, wherein diffusion particles or bubbles are uniformly distributed inside the first optical structure.

7. The transparent display device according to claim 2, wherein both the first optical structure and the convex structures are made of transparent materials.

8. The transparent display device according to claim 7, wherein the first optical structure and the convex structures are made of a same material.

9. The transparent display device according to claim 8, wherein the first optical structure and the convex structures are structured integrally; or
    the first optical structure fit onto the convex structures via transparent optical adhesive.

10. The transparent display device according to claim 1, wherein a thickness of the first optical structure lies between 1.5 mm and 4.5 mm.

11. The transparent display device according to claim 1, wherein the second optical structure is a circular truncated cone; and
    a diameter of a surface of the second optical structure on a side thereof proximate to the first optical structure is greater than a diameter of a surface of the second optical structure on a side thereof proximate to the light sources, and a side surface of the second optical structure is coated with a reflection layer.

12. The transparent display device according to claim 11, wherein the diameter of the surface of the second optical structure on the side thereof proximate to the first optical structure is not greater than a thickness of the first optical structure.

13. The transparent display device according to claim 12, wherein the diameter of the surface of the second optical structure on the side thereof proximate to the first optical structure lies between 1.5 mm and 4.5 mm, and a thicknesses of the second optical structure lies between 0.56 mm and 1.68 mm.

* * * * *